United States Patent
Delcourt et al.

(10) Patent No.: US 6,741,071 B2
(45) Date of Patent: May 25, 2004

(54) SYSTEM AND PROCESS FOR EXPLOITING A TEST

(75) Inventors: Jean-Paul Charles Albert Delcourt, Grace-Hollogne (BE); Robert Lambert Gilbert Malbrouck, Alleur (BE)

(73) Assignee: Techspace Aero, Milmort-Herstal (BE)

( * ) Notice: Subject to any disclaimer, the term of this patent is extended or adjusted under 35 U.S.C. 154(b) by 103 days.

(21) Appl. No.: 09/731,791

(22) Filed: Dec. 8, 2000

(65) Prior Publication Data

US 2001/0003420 A1 Jun. 14, 2001

(30) Foreign Application Priority Data

Dec. 9, 1999 (EP) .............................. 99204173

(51) Int. Cl.⁷ .............................................. G06F 15/20
(52) U.S. Cl. ................................ 324/158.1; 364/424.04
(58) Field of Search ............................. 324/158.1, 765, 324/754, 73.1, 73; 364/424.04, 424.05; 702/75–78; 714/734, 724, 719; 395/500.39

(56) References Cited

U.S. PATENT DOCUMENTS

| | | | | |
|---|---|---|---|---|
| 5,023,791 A | * | 6/1991 | Herzberg et al. ...... 364/424.04 |
| 5,111,402 A | * | 5/1992 | Brooks et al. ......... 364/424.03 |
| 5,552,984 A | * | 9/1996 | Crandall et al. | |
| 5,963,734 A | * | 10/1999 | Ackerman et al. ..... 395/500.39 |
| 6,114,848 A | * | 9/2000 | Suto et al. ............... 324/158.1 |
| 6,115,656 A | * | 9/2000 | Sudolsky ..................... 701/35 |

FOREIGN PATENT DOCUMENTS

| | | | | |
|---|---|---|---|---|
| EP | 0 342 970 | | 11/1989 | |
| EP | 0342970 | * | 11/1989 | ............. G01L/5/13 |

* cited by examiner

Primary Examiner—Kamand Cuneo
Assistant Examiner—Jimmy Nguyen
(74) Attorney, Agent, or Firm—Oblon, Spivak, McClelland, Maier & Neustadt, P.C.

(57) ABSTRACT

The test rig of a machine (1) includes a distributed exploitation of the test results, where the signals originating from the sensors (2) are ordered into a single signal, passing through a broad pass-band cable (6), via a common acquisition module (5). The computers (11, 12, 13) in association with miscellaneous display means (7, 8, 9, 10) search for the measurements which interest them on pre-set frames of the signal by using lists of relations contained in a host computer (12).

6 Claims, 2 Drawing Sheets

Figure 1:
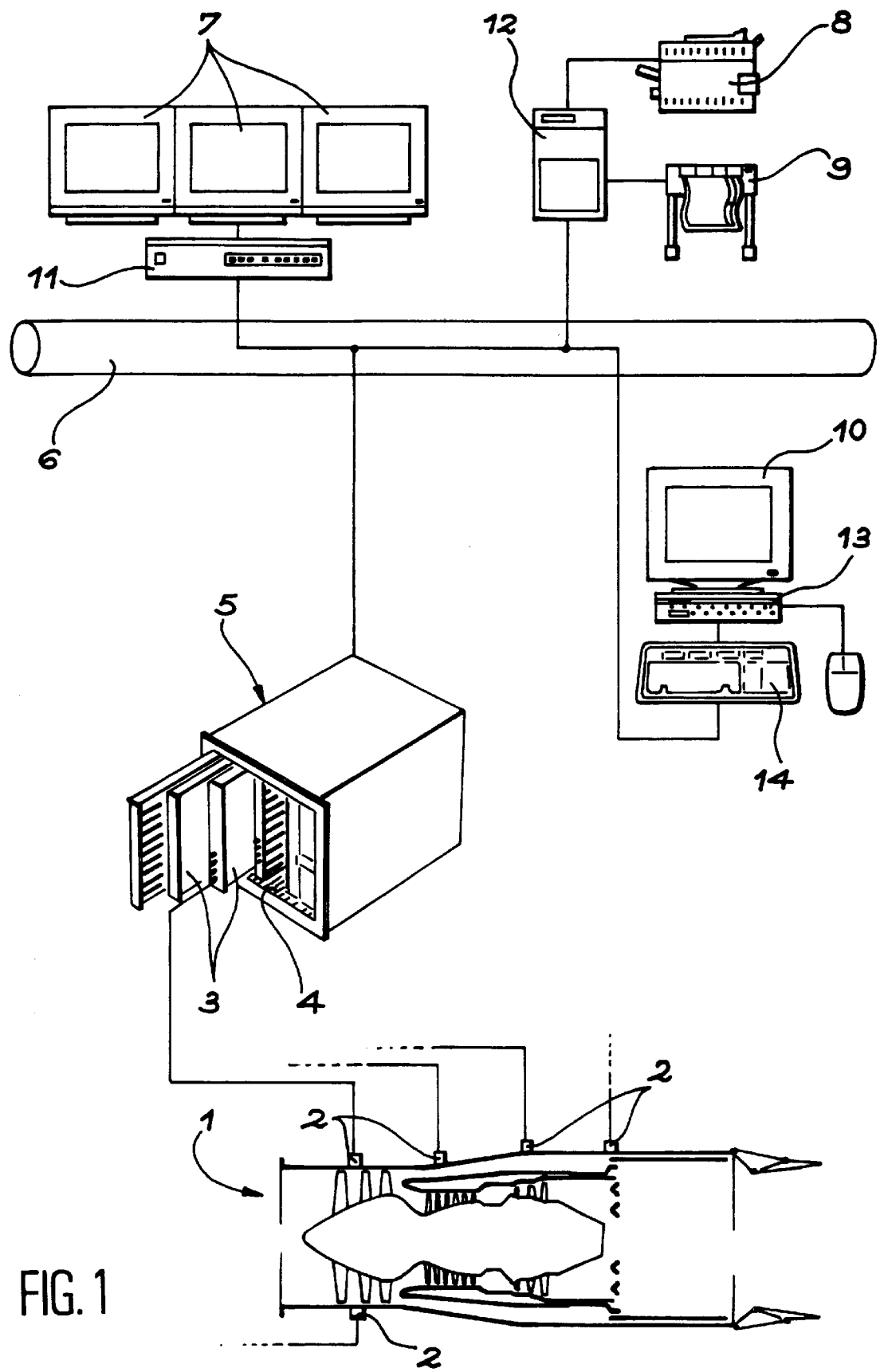

| EVENT | SENSOR |
|---|---|
| $P_{EXT}$ | $C_1$ |
| $P_1$ | $C_2$ |
| $P_2$ | $C_3$ |
| . | . |
| . | . |
| . | . |
| $T_0$ | $C_i$ |
| . | . |
| . | . |
| . | . |

| SENSOR | TERMINAL |
|---|---|
| $C_1$ | $B_5$ |
| $C_2$ | $B_8$ |
| $C_3$ | $B_2$ |
| . | . |
| . | . |
| . | . |
| $C_i$ | $B_j$ |
| . | . |
| . | . |
| . | . |

| TERMINAL | FRAME |
|---|---|
| $B_1$ | $T_n$ |
| $B_2$ | $T_n$ |
| . | . |
| . | . |
| . | . |
| $B_j$ | $T_x$ |
| . | . |
| . | . |
| . | . |

| SENSOR | COEFFICENT |
|---|---|
| $C_1$ | a |
| $C_2$ | b |
| $C_3$ | c |
| . | . |
| . | . |
| . | . |
| $C_i$ | k |
| . | . |
| . | . |
| . | . |

FIG. 2

SYSTEM AND PROCESS FOR EXPLOITING A TEST

BACKGROUND OF THE INVENTION

1. Field of the Invention

DESCRIPTION

There follows a description of a system of devices for exploiting a test, and a corresponding process.

Some machine test rigs include a substantial number of sensors collecting data from the test and of visualisation or display means of the test results, which express the data measured by the sensors after it has been converted into physical quantities in accordance with the calibration of the sensors and presented in an intelligible way for the personnel. A computer is used to do these conversions. This is therefore the cornerstone of the rig, receiving and storing the measurements of the sensors and transmitting the converted results by apportioning them among the different display means, as previously programmed. The sensors and the display means seem like subordinate means of the rig. However, it is difficult to add to or even to change their setting during a test run, since the computer has to be reprogrammed for any change of configuration of the rig, which compels a new compilation. It is not always known in advance what measurements will be useful and some measurements may be of interest only during some tests or some test parts in the run. The difficulties of reconfiguring the system therefore make it tempting to provide an overabundant number of sensors and display means which are exploited during an entire test run, but this stopgap measure, which leads in any case to high costs in hardware, is not always practicable since corresponding quantities of measurements and results have to be collected and transmitted, while the processing speed of the computer is limited. There is a danger of no longer being able to exploit the data in real time and of losing the potential to modify the initially planned sequence of operations of a test in progress or even to interrupt it in time if an unforeseen, interesting or on the contrary dangerous event occurs.

Another drawback in addition to the rigidity of the centralised system is that hardware incompatibility problems have constantly to be overcome, as soon as it is desired to use devices of different manufacturers.

The origin of the invention is the desire to overcome these drawbacks. The main characteristic of the exploitation system proposed here is that the arrangement traditional to the mainframe computer is abandoned in favour of a decentralised or distributed arrangement in which the sensors and display devices operate largely independently of each other.

To sum up, the invention concerns in its most general form a test exploitation process, including a taking of test measurements by sensors, a conversion of the test measurements into test results and a display of the test results by separate devices, characterised in that the test measurements are ordered into a common signal according to a pre-set format, and computers in association respectively with the display devices consult a common database so as to read respective portions of the signal and convert said portions into the test results.

The sequencing of the measurements into a common signal passing through a cable allows slow processing and storing operations in a computer to be avoided. A display means may be assigned or reassigned to any measurement at will by the personnel, with no retardant effect on the sequence of operations of the display of the other results: the computer of this means reads in the database the relations which allow it to identify the portions of the signal in which are found the new measurements and to convert these measurements by means of calibration coefficients also contained in this database; no overall reconfiguration of the system is made. Such a process makes it possible in fact to follow on the display means only the momentarily interesting events of the test, by switching the categories of results displayed as often as necessary.

In practice, the cable has sufficient bandwidth to withstand the passage of a very large number of results, much greater than the requirement of actual test rigs: the bottleneck constituted by the mainframe computer disappears. It is moreover easy to add sensors, since their measurements will be incorporated into the overall signal according to the pre-set format in voids of this signal; to the database will be added a simple operation to list the existence and the characteristics of this sensor. Likewise, the addition of new display means raises no difficulties.

The proposed exploitation system includes sensors placed on a test subject, a device for data acquisition from the sensors, devices for displaying test results and system control means connected to the acquisition and results' display device, and it is original in that the control means include separate computers serving the display devices respectively, a host computer housing a database and a cable to which the computers and the data acquisition device are connected; the data acquisition device is designed to transmit down the cable the data from the sensors into a common signal of pre-set format; and the computers serving the display devices are programmed to consult the database so as to extract respective portions of interest from the signal, and to convert these portions of interest into the test results, the database including coefficients of calibration of the sensors and of the relations between, particularly, the sensors and respective parts of the signal.

The invention will now be described in relation to the following figures, which show a particular embodiment of it:

FIG. 1 is a general view of the system, and FIG. 2 is a diagram of the content of the database.

The test rig is used to test a machine 1 such as a turbojet engine, in which a certain number of temperature, precision sensors 2 etc. have been placed at requisite locations. Each of the sensors 2 is connected to an acquisition card 3, and the acquisition cards 3 are driven into the slots of a rack 4 mounted in the enclosure of a measurement acquisition module 5. The acquisition module 5 is here an HP 75VXI engine able to collect the signals coming from the sensors 2 and having passed through the acquisition cards 3, and to order these signals into a single signal which is sent in an Ethernet cable 6 to which the acquisition module 5 is connected by its output terminal. The VXI standard of the acquisition module 5 allows the outputs of the sensors 2 to be inserted in individual frames of the signal, i.e. signal portions found at invariable and periodic locations as a function of the position of its card 3 in the rack 4. The unoccupied frames of the signal may be used to transmit outputs of other sensors when their cards have been inserted into the acquisition module 5.

Display and visualisation means may include screens 7, a printer 8, a graph plotter 9 and a monitoring screen 10. These means are connected to the cable 6 by separate computers, in association respectively with one of these means or with a small group of these means, a computer 11 here serving the display screens 7, a computer 12 serving the printer 8 and the graph plotter 9, and a computer 13 serving the monitoring screen 10. A keyboard 14 connected to the computer 13 gives control of the entire system.

Depending on the event it is required to display, the computers 11, 12 and 13 are programmed to search the signal passing through the cable 6 for the data which interests them and to display it on the display device that they serve. They must have recourse to a database, which is housed in a host computer which may be a special computer or one of the computers already encountered; here, it will be supposed that the computer 12 is a host computer.

The database includes the information necessary to pass measurements from the sensors 2 to the test results, which alone are of interest to the personnel. With reference to FIG. 2, it may be seen that the content of the database may consist of lists of relations linking the events to be measured (for example external pressure, other pressures, the ambient temperature) to sensors 2, called C1, C2, etc., the sensors to input terminals B of the acquisition module 5 (in association with slots of the rack 4) and the terminals B to frames of the signal passing through the cable 6. If it is deemed necessary to display a temperature T0 on a display screen 7, a reading of the database shows that the measurements are provided by the sensor Ci which is located at terminal Bj of the acquisition module 5, and that the measurement of the sensor concerned will be found at frame Tx. For the measurement to be exploitable, it is also necessary to have available the calibration coefficient of the sensor Ci, which will be found to be equal to the value k on consulting another list. If it is decided subsequently that displaying this temperature To is unnecessary, the screen 7 may be able to be assigned to another display; if it is then decided to dispense with this measurement altogether, the acquisition card 3 in association with this sensor Ci will be withdrawn from the acquisition module 5 and the relations where the sensor Ci intervenes in the database will be deleted. The slot left unoccupied in the acquisition module 5 may then receive the acquisition card of another sensor 2, which will be confirmed by listing this sensor opposite the terminal Bj, and by adding to the relations associating it with an event and with a calibration coefficient. The addition of new display means may be done without formality. The modification of a calibration coefficient will require only a rewrite in the list concerned, without it being necessary to reprogram the computers 11, 12 and 13. It may be seen that even if a calibration error is made, it will affect all the display means concerned. If for example this error is confined to an error of scale or of unit, the results may still be able in many cases to be exploited bearing in mind that a proportion factor will have to be applied to the event concerned, without there being any discordance between the display means from which these results originate.

This system makes it possible to request results with a frequency different for each measurement. The acquisition module 5 is then instructed by the keyboard 14 to supply the output of the acquisition card 3 concerned at the frequency required in the frame which is reserved for it in the signal. Interesting events may therefore be followed and displayed with the precision required.

The database may include other information relative to the test and to its exploitation, such as the successive calibrations of the sensors 2, and archiving and test history data.

FIG. 2
PHENOMENE=EVENT
CAPTEUR=SENSOR
BORNE=TERMINAL
TRAME=FRAME
COEFFICIENT = COEFFICIENT

What is claimed is:

1. A test exploitation system, including sensors placed on a test subject, a device for data acquisition from the sensors, devices for displaying test results and system control means connected to the data acquisition device and to the devices for displaying results, characterized in that the control means includes separate computers serving the display devices respectively, a host computer housing a database and a cable to which the computers and the data acquisition device are connected; the data acquisition device is designed to transmit down the cable the data from the sensors in a common signal of pre-set format; and the computers serving the display devices are programmed to consult the database so as to extract respective portions of interest from the signal, and to convert these portions of interest into the test results, the database including coefficients of calibration of the sensors and of the relations between, particularly, the sensors and respective parts of the signal.

2. A test exploitation system according to claim 1, characterized in that the acquisition module includes an enclosure for inserting acquisition cards connected respectively to the sensors.

3. A test exploitation system according to claim 1, characterized in that the acquisition module is designed to transmit down the cable the data from the sensors at independently adjustable frequencies.

4. A test exploitation system, including sensors placed on a test subject, a device for data acquisition from the sensors, devices for displaying test results and system control means connected to the data acquisition device and to the devices for displaying results, characterized in that the control means includes a plurality of computers serving the display devices respectively, a host computer housing a database and one common cable to which the computers and the data acquisition device are directly connected; the data acquisition device is designed to transmit down the cable the data from the sensors in a common signal of pre-set format; and the computers serving the display devices are programmed to consult the database so as to extract respective portions of interest from the signal, and to convert these portions of interest into the test results, the database including coefficients of calibration of the sensors and of relations between, particularly, the sensors and respective parts of the signal.

5. A test exploitation system according to claim 4, characterized in that the acquisition module includes an enclosure for inserting acquisition cards connected respectively to the sensors.

6. A test exploitation system according to claim 4, characterized in that the acquisition module is designed to transmit down the cable the data from the sensors at independently adjustable frequencies.

* * * * *